United States Patent
Shivaram et al.

(10) Patent No.: US 12,523,689 B2
(45) Date of Patent: Jan. 13, 2026

(54) LOW POWER CAPACITOR SENSOR ARRAY

(71) Applicant: Raytheon Company, Waltham, MA (US)

(72) Inventors: Krishna Shivaram, Torrance, CA (US); Phung N. Phan, Simi Valley, CA (US); Bronson Riley Edralin, Carson, CA (US)

(73) Assignee: Raytheon Company, Arlington, VA (US)

( * ) Notice: Subject to any disclaimer, the term of this patent is extended or adjusted under 35 U.S.C. 154(b) by 233 days.

(21) Appl. No.: 18/169,417

(22) Filed: Feb. 15, 2023

(65) Prior Publication Data

US 2024/0272213 A1      Aug. 15, 2024

(51) Int. Cl.
*G01R 27/26* (2006.01)

(52) U.S. Cl.
CPC .................... *G01R 27/2605* (2013.01)

(58) Field of Classification Search
CPC ................................................ G01R 27/2605
See application file for complete search history.

(56) References Cited

U.S. PATENT DOCUMENTS

| | | |
|---|---|---|
| 6,803,794 B2 | 10/2004 | Martin et al. |
| 7,882,679 B2 | 2/2011 | Carlson et al. |
| 7,906,976 B2 | 3/2011 | Remmers et al. |
| 8,947,107 B2 | 2/2015 | Chevroulet |
| 9,078,613 B2 | 7/2015 | Irazoqui et al. |
| 9,612,266 B2 * | 4/2017 | Moedl ................ G01D 5/24 |
| 9,658,666 B1 | 5/2017 | Ghayal et al. |
| 10,102,411 B2 | 10/2018 | Lillie et al. |
| 10,191,597 B2 | 1/2019 | Khazeni et al. |
| 10,733,409 B2 | 8/2020 | D'Souza et al. |
| 2003/0230733 A1 | 12/2003 | Tanaka |
| 2011/0273400 A1 * | 11/2011 | Kwon ............ G06F 3/04166 327/337 |
| 2012/0161846 A1 * | 6/2012 | Ningrat ........... G06F 3/04182 327/365 |
| 2013/0162857 A1 | 6/2013 | Kwon et al. |
| 2015/0108955 A1 * | 4/2015 | Yeo ................ G01R 27/2605 323/282 |

(Continued)

FOREIGN PATENT DOCUMENTS

JP      2019161650 A      9/2019

OTHER PUBLICATIONS

Translation of KR 20110118520 A (Year: 2011).*

(Continued)

*Primary Examiner* — Paresh Patel
(74) *Attorney, Agent, or Firm* — Schwegman Lundberg & Woessner, P.A.

(57) ABSTRACT

A capacitive sensor and capacitive sensing method including a driver device having a first input configured to receive a clock signal, a second input configured to receive a charging voltage, a third input configured to receive a common-mode voltage, and an output; a first capacitor configured to be sensed, having a first terminal connected to the output of the driver device and a second terminal; and a receiver device having a first input configured to receive the clock signal, a second input connected to the second terminal of the first capacitor, and a third input configured to receive the common mode voltage.

16 Claims, 5 Drawing Sheets

(56) References Cited

U.S. PATENT DOCUMENTS

| | | | | |
|---|---|---|---|---|
| 2015/0184989 A1* | 7/2015 | Jo | ........................ | G06F 3/0446 |
| | | | | 345/174 |
| 2016/0188116 A1* | 6/2016 | Kim | .................... | G06F 3/04184 |
| | | | | 345/174 |
| 2018/0238944 A1* | 8/2018 | Yoo | ...................... | G01R 35/005 |
| 2021/0072048 A1* | 3/2021 | Sobukawa | ......... | G01R 27/2605 |
| 2025/0003772 A1* | 1/2025 | Shivaram | ................ | G01D 5/24 |

OTHER PUBLICATIONS

Translation of KR 20110103790 A (Year: 2011).*
"U.S. Appl. No. 18/350,043, Ex Parte Quayle Action mailed Apr. 3, 2025", 5 pgs.
"U.S. Appl. No. 18/350,043, Response filed Jun. 3, 2025 to Ex Parte Quayle Action mailed Apr. 3, 2025", 13 pgs.
"U.S. Appl. No. 18/350,043, Notice of Allowance mailed Jun. 18, 2025", 8 pgs.

* cited by examiner

LOW POWER CAPACITOR SENSOR ARRAY

STATEMENT REGARDING FEDERALLY SPONSORED RESEARCH OR DEVELOPMENT

This disclosure was made with U.S. Government support under Contract No. FA8807-21-C-0006 awarded by the U.S. Air Force. The U.S. Government has certain rights in the disclosure.

BACKGROUND

Capacitive sensors are useful in detecting a disturbance on an Application Specific Integrated Circuit (ASIC), where a disturbance is any act that changes a capacitance value of a capacitor in a sensor array, causes an open circuit in a sensor array, or causes a short circuit in a sensor array. However, a complex radio frequency (RF) voltage-controlled oscillator (VCO) and inductance-based techniques used by conventional methods makes it more difficult to scale due to area and power consumption limitations.

Conventional devices and methods that use voltage controlled oscillators (VCOs), inductors, and mixers are prone to parasitics and large errors in frequency and jitter. Use of multiple inductors and capacitors in conventional methods leads to a larger ASIC area, which hinders scalability. When several inductors are used in the conventional devices and methods, unwanted oscillations and undesirable effects may occur.

The output of a conventional method may not be linearly related to capacitor changes, which may add to uncertainty in detection.

SUMMARY

In accordance with the concepts described herein, exemplary devices and methods provide a low-power capacitor sensor array. The present disclosure reduces power consumption, reduces area, and increases performance.

In accordance with the concepts described herein, exemplary devices and methods utilize a demultiplexer/multiplexer topology that shares a common driver device and receiver to save area, save power, and improve scalability.

In accordance with the concepts described herein, exemplary devices and methods reduce error and effect of clock jitter by measuring a fully settled voltage value (instead of a charging ramp voltage at a certain time point corresponding to a clock edge) utilizing a high-resolution temperature-compensated analog-to-digital converter (ADC).

The present disclosure utilizes drivers and receiver devices in a demultiplexer/multiplexer architecture with an intertwined switched capacitor architecture to reduce the number of driver devices and receiver devices required by a factor of N, where N is a positive integer that indicates a size of an N×N capacitor sensor array of the present disclosure. The switched capacitor scheme also reduces the effects of clock jitter.

The present disclosure provides an exemplary device and method that utilizes a switched-capacitor method for transferring charge on an array capacitor being sensed to a capacitor in a receiver.

The present disclosure provides an exemplary device and method provides uniformity in detection across a range via linear input-output transfer characteristics.

The present disclosure provides an exemplary device and method that detects array capacitance changes to a 12-13 bit resolution.

The present disclosure provides an exemplary device and method that utilizes a switched capacitor charging technique, which avoids the use of RF antennas and voltage controlled oscillators (VCOs) and, thereby, reduces power consumption.

The power dissipation in conventional methods is comprised of static power and a significant amount of dynamic power, whereas the power dissipation of the present disclosure is mainly static power.

DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principles of the concepts described herein. Like reference numerals designate corresponding parts throughout the different views. Furthermore, embodiments are illustrated by way of example and not limitation in the figures, in which.

DETAILED DESCRIPTION

Figure 1:
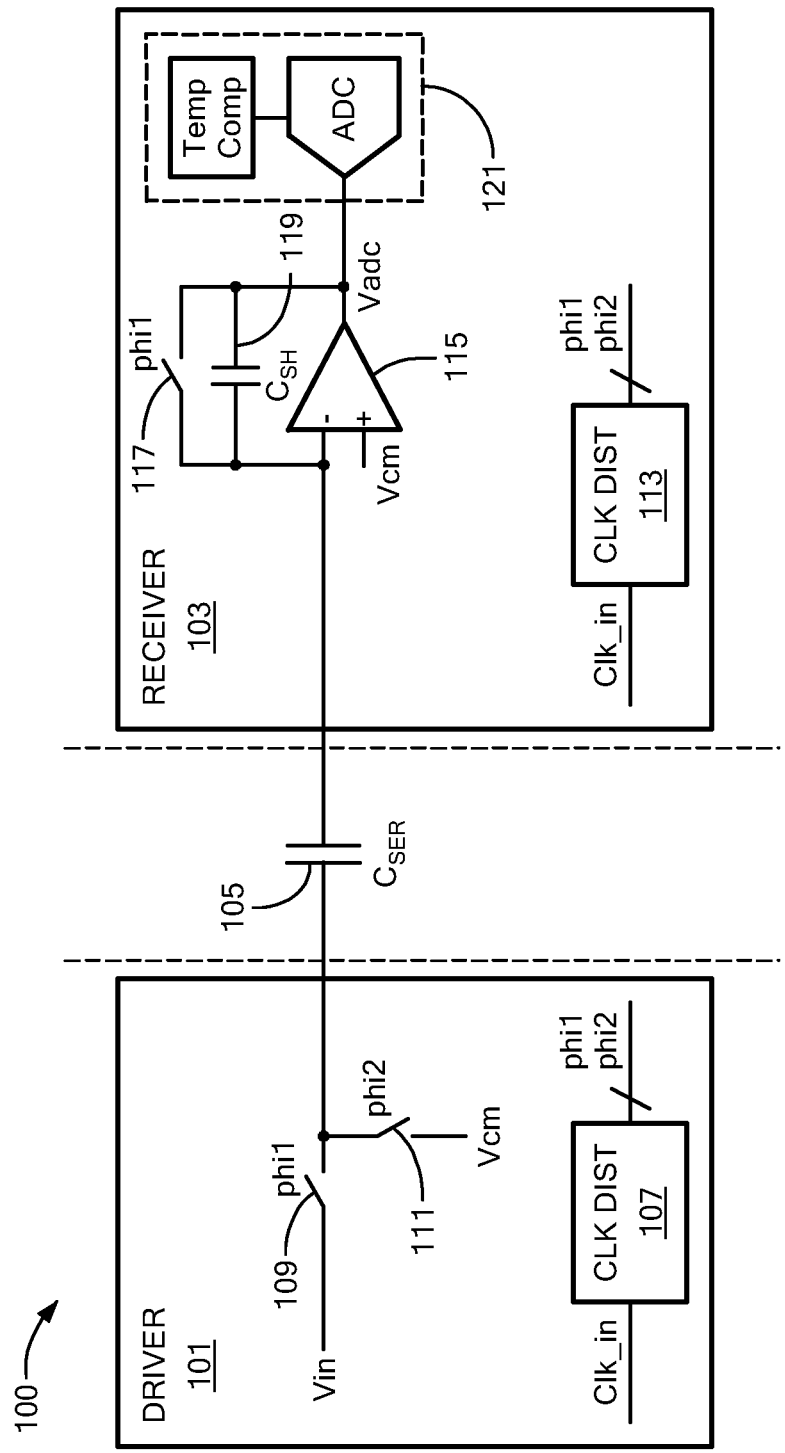
FIG. 1 is an illustration of an exemplary low-power capacitor sensor according to the present disclosure.

FIG. 1 is an illustration of an exemplary low-power capacitor sensor 100 according to the present disclosure comprising a driver device 101, a receiver device 103 and a first capacitor 105 to be sensed (e.g., a series capacitor Cser).

The driver device 101, which may function as a row decoder, comprises a first clock distribution device 107, a first switch 109, and a second switch 111. The first clock distribution device 107 comprises an input for receiving a clock signal (e.g., Clk_in which may be a square wave) and an output bus (e.g., a 2-wire bus) for providing two non-overlapping clock signals (e.g., phi1 and phi2). That is, the first clock distribution device 107 may be a non-overlapping two-phase clock generator, where the two phases do not have a high value (e.g., a logic one value) at the same time.

The first switch 109 comprises an input, an output, and a control input. The first switch 109 functions as single-pole single-throw switch, where a voltage on the control input controls connectivity between the input and the output. For example, a high, or logic one, voltage on the control input connects the input and the output and a low, or logic zero, voltage on the control input disconnects the input and the output. However, the present disclosure is not limited thereto (e.g., opposite polarities for connecting and disconnecting the input and the output may be used). The input of the first switch 109 receives an input voltage (e.g., Vin). The control input of the first switch 109 is connected to the phi1 output of the output bus of the first clock distribution device 107. When phi1 is a high (e.g., logic 1) voltage, the voltage on the output of the first switch 109 is Vin.

The second switch 111 comprises an input, an output, and a control input. The second switch 111 functions identically as the first switch 109. The input of the second switch 111 receives an input voltage (e.g., a common mode voltage Vcm of an operational amplifier (opamp) or a ground potential). The control signal of the second switch 111 is connected to the phi2 output of the output bus of the first clock distribution device 107. When phi2 is a high (e.g., logic 1) voltage, the voltage on the output of the second switch 111 is Vcm (e.g., a ground potential).

The first capacitor 105 (e.g., Cser) may be a parallel plate capacitor having a top plate, a bottom plate, and a dielectric material between the top plate and the bottom plate (e.g., one capacitor in a capacitor array). However, the present disclosure is not limited thereto. Other types of capacitors may be used (e.g., spherical capacitor, cylindrical capacitor, etc.). The output of the first switch 109 and the output of the second switch 111 are connected to the top plate of the first capacitor 105 (e.g., Cser).

The receiver 103, which may function as a column decoder, comprises a second clock distribution device 113, an opamp 115, a third switch 117, a second capacitor 119 (e.g., a shunt capacitor Csh), and a temperature-compensated analog-to-digital converter (ADC) 121. The second clock distribution device 113 comprises a first input for receiving the clock signal received by the first clock distribution device 107 in the driver device 101 (e.g., a square wave) and an output bus (e.g., a 2-wire bus) for providing two non-overlapping clock signals (e.g., phi1 and phi2 which are identical to phi1 and phi2 provided by the first clock distribution device 107).

The opamp 115 comprises a negative input connected to the bottom plate of the first capacitor 105 (e.g., Cser), a positive input for receiving the common mode voltage (e.g., Vcm or a ground potential), and an output. The third switch 117, which is identical to the first switch 109 and the second switch 111 of the driver device 101, comprises an input connected to the negative input of the opamp 115, a control input connected to the phi1 output of the output bus of the second clock distribution device 113, and an output connected to the output of the opamp 115. The second capacitor 119 (e.g., Csh) is connected between the negative terminal and the output of the opamp 115.

The temperature-compensated ADC 121 is connected to the output of the opamp 115. The temperature-compensated ADC 121 compensates for changes in temperature as further described below with reference to FIG. 2.

In an exemplary embodiment, when Vin equal to 500 mV is applied to the inputs of the first switch 311 and the third switch 315, phi1 applied to the control input of the first switch 109 and the control input of the third switch is a high (or logic one) voltage, phi2 applied to the control input of the second switch 111 is a low (or logic zero) voltage, and Vcm is applied to the positive terminal of the opamp 115, Vin is applied to the top plate of the first capacitor 105 (e.g., Cser).

Vcm is applied to the bottom plate of the first capacitor 105 (e.g., Cser) due to a virtual ground of the opamp 115. The voltage across the first capacitor 105 (e.g., Cser) from the top plate to the bottom plate is Vin−Vcm and the voltage across the second capacitor 119 is zero volts since Vcm is applied to the negative input and the output of the opamp 115.

When phi1 goes to a low (or logic zero) voltage, phi2 goes to a high (or logic one) voltage, where phi1 and phi2 are non-overlapping clock phases, Vcm is applied across both plates of the first capacitor 105 (e.g., Cser). Due to the charge conservation principle, the charge on the first capacitor 105 (e.g., Cser) is transferred to the second capacitor 119 (e.g., Csh). Thus, the voltage across the first capacitor 105 when phi1 is high (e.g., (Vin−Vcm)×Cser) is equal to the voltage across the second capacitor 119 when phi1 is low (e.g., (Vadc−Vcm)×Csh) as in Equation (1) below, where Vadc is the voltage at the output of the opamp 115 and the input of the temperature-compensated ADC 121, where the temperature-compensated ADC 121 digitizes Vadc.

$$(Vin - Vcm) \times Cser = (Vadc - Vcm) \times Csh \quad (1)$$

Solving Equation (1) for Vadc is as in Equation (2) below.

$$Vadc = Vcm + \left(\frac{Cser}{Csh}\right) \times (Vin - Vcm) \quad (2)$$

For Vcm equal to 0 volts, Equation (2) above may be rewritten as Equation (3) below, where k is a gain factor of the opamp amplifier 115.

$$\frac{Vadc}{Vin} = \frac{Cser}{Csh} \times k \quad (3)$$

In an exemplary embodiment, where the first capacitor 105 (e.g., Cser) equals the second capacitor 119 (e.g., Csh), k equals 1 and Vadc is as in Equation 4 below. However, k may be any real number.

$$Vadc = Vin\left(\frac{Cser}{Csh}\right) \quad (4)$$

Figure 2:
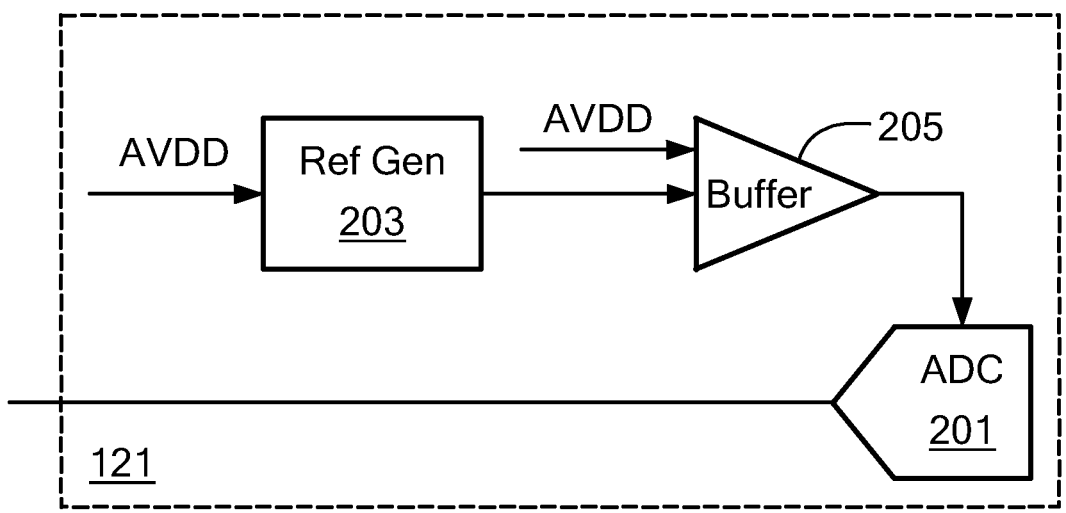
FIG. 2 is an illustration of an exemplary analog-to-digital converter (ADC) with temperature compensation according to the present disclosure.

FIG. 2 is an illustration of the exemplary temperature-compensated ADC 121 of FIG. 1 according to the present disclosure.

The temperature-compensated ADC 121 comprises an ADC without temperature compensation 201 (e.g., an ADC with 12 to 13 bits of resolution), a reference generator (Ref Gen) 203, and a buffer device 205. The ADC without temperature compensation 201 comprises a negative terminal and an input.

The reference generator 203 comprises an input for receiving an analog power supply voltage AVDD and an output at which appears a constant voltage independent of temperature and supply voltage. The reference generator compensates for a temperature coefficient of the low-power capacitor sensor 100, including the first capacitor 105 (e.g., Cser). The buffer device 205 comprises a first input for receiving AVDD, a second input connected to the output of the reference generator 203 for receiving the constant voltage independent of temperature and supply voltage, and an output (e.g., nominally 500 mv) with an adjustable slope for a conversely proportional to absolute temperature voltage (CTAT), a proportional to absolute temperature (PTAT) voltage, and/or a bandgap voltage. The output of the buffer device 205 is connected to the negative terminal of the ADC without temperature compensation 201 in order to provide temperature compensation thereto.

Figure 3:
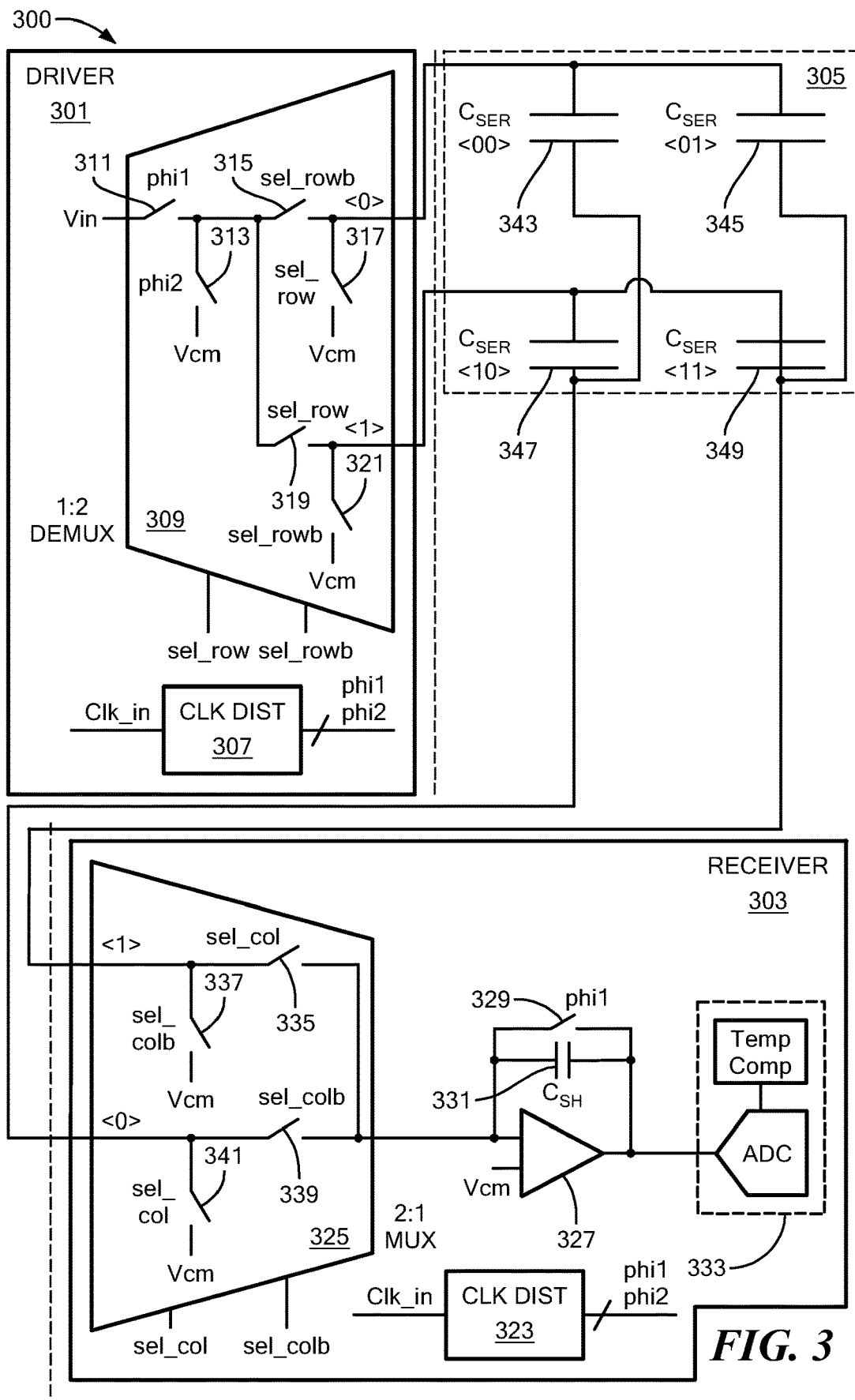
FIG. 3 is an illustration of an exemplary low-power capacitor sensor array according to the present disclosure.

FIG. 3 is an illustration of an exemplary low-power capacitor sensor array 300 according to the present disclosure. The low-power capacitor sensor array 300 comprises a driver device 301, a receiver device 303 and a capacitor array 305 with capacitors to be sensed (e.g., four series capacitors $Cser_{00}$ 343, $Cser_{01}$ 345, $Cser_{10}$ 347, and $Cser_{11}$ 349). FIG. 3 illustrates an exemplary 2×2 capacitor array. However, the present disclosure is not limited thereto. For example, the low-power capacitor sensor array 300 may be an N×N capacitor array, where N is a positive integer (e.g., N is equal to 32 for a 32×32 capacitor array).

The driver device 301, which may function as a row decoder, comprises a first clock distribution device 307 and a 1:2 demultiplexer 309 (e.g., a 1:2 demux). The first clock distribution device 307 comprises an input for receiving a clock signal (e.g., Clk_in which may be a square wave) and an output bus (e.g., a 2-wire bus) for providing two non-overlapping clock signals (e.g., phi1 and phi2). That is, the first clock distribution device 307 may be a non-overlapping two-phase clock generator, where the two phases of the output signals of the first clock distribution device 307 do not have a high value (e.g., a logic one value) at the same time.

The 1:2 demultiplexer 309 comprises a first input for receiving a first input voltage (e.g., Vin), a second input for receiving a common mode voltage (e.g., Vcm or ground), a third input for receiving a row selection signal (e.g., sel_row) for selecting a row of the capacitor array 305 (e.g., whether Vin or Vcm appears on one row of the capacitor array 305 while a common mode voltage or ground potential voltage (e.g., 0 volts) appears on the other row of the capacitor array 305), a fourth input for receiving an inverse row selection signal (e.g., sel_rowb), which is the inverse of the sel_row signal, for selecting a row of the capacitor array 305, a first switch 311, a second switch 313, a third switch 315, a fourth switch 317, a fifth switch 319, and a sixth switch 321.

The first switch 311 comprises an input, an output, and a control input. The first switch 311 functions as single-pole single-throw switch, where a voltage on the control input controls connectivity between the input and the output. For example, a high, or logic one, voltage on the control input connects the input and the output and a low, or logic zero, voltage on the control input disconnects the input and the output. However, the present disclosure is not limited thereto (e.g., opposite polarities for connecting and disconnecting the input and the output may be used). The input of the first switch 311 receives the first input voltage (e.g., Vin). The control input of the first switch 311 is connected to the phi1 output of the output bus of the first clock distribution device 307. When phi1 is a high (e.g., logic 1) voltage, the voltage on the output of the first switch 311 is Vin.

The second switch 313 comprises an input, an output, and a control input. The second switch 313 functions identically to the first switch 311. The input of the second switch 313 receives the second input voltage (e.g., Vcm, which may be a common mode voltage of an operational amplifier (opamp) or a ground potential voltage). The control signal of the second switch 313 is connected to the phi2 output of the output bus of the first clock distribution device 307. When phi2 is a high (e.g., logic 1) voltage, the voltage on the output of the second switch 313 is Vcm (e.g., a ground potential).

The third switch 315 comprises an input, an output, and a control input. The third switch 315 functions identically as the first switch 311. The input of the third switch 315 is connected to the output of the first switch 311. The control input of the third switch 315 receives the sel_rowb signal. When sel_rowb is a high (e.g., logic 1) voltage, the voltage on the output of the third switch 315 is the voltage on the input of the third switch 315. The output of the third switch 315 is connected to the first row of the capacitor array 305.

The fourth switch 317 comprises an input, an output, and a control input. The fourth switch 317 functions identically as the first switch 313. The input of the fourth switch 317 receives the second input voltage (e.g., Vcm, which may be a common mode voltage of an operational amplifier (opamp) or a ground potential voltage). The control input of the fourth switch 317 receives the sel_row signal. When sel_row is a high (e.g., logic 1) voltage, the voltage on the output of the fourth switch 317 is Vcm (e.g., a ground potential voltage). The output of the fourth switch 317 is connected to the first row of the capacitor array 305.

The fifth switch 319 comprises an input, an output, and a control input. The fifth switch 319 functions identically as the first switch 313. The input of the fifth switch 319 is connected to the output of the first switch 311. The control input of the fifth switch 319 receives the sel_row signal. The output of the fifth switch 319 is connected to the second row of the capacitor array 305. When sel_row is a high (e.g., logic 1) voltage, the voltage on the output of the fifth switch 319 is the voltage on the input of the fifth switch 317. However, the present disclosure is not limited thereto (e.g., a low (e.g., logic 0) voltage may cause the voltage of the output of the fifth switch 319 to be the voltage of the input of the fifth switch 317.

The sixth switch 321 comprises an input, an output (e.g., the second row of the capacitor array 305), and a control input. The sixth switch 321 functions identically as the first switch 311. The input of the sixth switch 321 receives the second input voltage (e.g., Vcm, which may be a common mode voltage of an operational amplifier (opamp) or a ground potential voltage). The control input of the sixth switch 321 receives the sel_rowb signal. The output of the sixth switch 321 is connected to the second row of the capacitor array 305. When sel_rowb is a high (e.g., logic 1) voltage, the voltage on the output of the sixth switch 321 is Vcm or a ground potential voltage. However, the present disclosure is not limited thereto (e.g., a low (e.g., logic 0) voltage may cause the voltage of the output of the sixth switch 321 to be Vcm or the ground potential voltage.

The first, second, third, and fourth capacitors 343, 345, 347, and 349 (e.g., $Cser_{00}$, $Cser_{01}$, $Cser_{10}$ and $Cser_{11}$) may each be a parallel plate capacitor having a top plate, a bottom plate, and a dielectric material between the top plate and the bottom plate (e.g., one of the capacitors in the capacitor array 305). However, the present disclosure is not limited thereto. Other types of capacitors may be used (e.g., spherical capacitor, cylindrical capacitor, etc.). The outputs of the third switch 315 and the fourth switch 317 are connected to the top plates of one of the rows (e.g., a first row) in the capacitor array 305 (e.g., the first capacitor 345 (e.g., $Cser_{00}$) and the second capacitor 347 (e.g., $Cser_{01}$). The outputs of the fifth switch 319 and the sixth switch 321 are connected to the top plates of another of the rows (e.g., a second row) in the capacitor array 305 (e.g., the third capacitor 349 (e.g., $Cser_{10}$) and the fourth capacitor 351 (e.g., $Cser_{11}$). However, the present disclosure is not limited thereto. The capacitor array 305 may be an N×N array, where N is a positive integer. In this case, the driver device 301 and the receiver 303 must be expanded to include a sufficient number of duplicate versions of their circuitry appropriately connected to accommodate the larger capacitor array.

The receiver 303, which may function as a column decoder, comprises a second clock distribution device 323, a 2:1 multiplexer 325 (e.g., a 2:1 MUX), an opamp 327, a seventh switch 329, a fifth capacitor 331 (e.g., a shunt capacitor Csh), and a temperature-compensated analog-to-digital converter (ADC) 333. The receiver 303 includes a first input for receiving the clock signal Clk_in received by the driver device 301, a second input for receiving Vcm or a ground potential voltage, a third input for receiving a column selection signal sel_col, a fourth input for receiving an inverse of col_sel (e.g., sel_colb), a fifth input for receiving a voltage on the first column of the capacitor array 305, and a sixth input for receiving a voltage on the second column of the capacitor array 305. The second clock distribution device 323 comprises an input connected to the first input of the receiver 303 for receiving Clk_in, which is also received by the first clock distribution device 307 in the driver device 301 (e.g., a square wave), and an output bus (e.g., a 2-wire bus) for providing two non-overlapping clock signals (e.g., phi1 and phi2 which are identical to phi1 and phi2 provided by the first clock distribution device 307). That is, the second clock distribution device 323 may be a non-overlapping two-phase clock generator, where the two phases of the output signals of the second clock generator 323 do not have a high value (e.g., a logic one value) at the same time.

The 2:1 multiplexer 325 comprises a first input connected to the first input of the receiver 303 for receiving a voltage on the first column of the capacitor array 305, a second input for receiving a voltage on the second column of the capacitor array 305, a third input for receiving Vcm (or a ground potential voltage), a fourth input for receiving the column selection signal sel_col for selecting which of the two column voltages of the capacitor array 305 will appear at an output of the 2:1 multiplexer, a fifth input for receiving the column selection signal sel_colb, which is the inverse of sel_col, for selecting which of the two column voltages of the capacitor array 305 will appear at the output of the 2:1 multiplexer, an eighth switch 335, a ninth switch 337, a tenth switch 339, and an eleventh switch 341.

The eight switch 335 comprises an input, an output, and a control input. The eighth switch 335 functions identically to the first switch 311 of the driver device 301. The input of the eighth switch 335 is connected to the second input of the 2:1 multiplexer 325. The control input of the eighth switch 335 receives the sel_col signal. When sel_col is a high (e.g., logic 1) voltage, the voltage on the output of the eighth switch 335 is the voltage on the second column of the capacitor array 305.

The ninth switch 337 comprises an input, an output, and a control input. The ninth switch 337 functions identically as the first switch 311 of the driver device 301. The input of the ninth switch 337 is connected to the second input of the receiver 303 to receive Vcm, which may be a common mode voltage of the operational amplifier (opamp) 327 or a ground potential voltage. The control signal of the ninth switch 337 is connected to the fourth input of the receiver 303 to receive sel_colb. When sel_colb is a high (e.g., logic 1) voltage, the voltage on the output of the ninth switch 337 is Vcm (e.g., a ground potential).

The tenth switch 339 comprises an input, an output, and a control input. The tenth switch 339 functions identically as the first switch 311 of the driver device 301. The input of the tenth switch 339 is connected to the first input of the 2:1 multiplexer 325 to receive the voltage on the first column of the capacitor array 305. The control input of the tenth switch 339 is connected to the fourth input of the receiver 303 to receive sel_colb. When sel_colb is a high (e.g., logic 1) voltage, the voltage on the output of the tenth switch 339 is the voltage on the first column of the capacitor array 305.

The eleventh switch 341 comprises an input, an output, and a control input. The eleventh switch 341 functions identically as the first switch 313 of the driver device 301. The input of the eleventh switch 341 is connected to the second input of the receiver 303 to receive Vcm (e.g., Vcm may be a common mode voltage of the operational amplifier (opamp) 327 or a ground potential voltage). The control input of the eleventh switch 341 is connected to the third input of the receiver 303 to receive sel_col. When sel_col is a high (e.g., logic 1) voltage, the voltage on the output of the eleventh switch 341 is Vcm (e.g., a ground potential voltage.

The opamp 327 comprises a negative input connected to the output of the 2:1 multiplexer 325, a positive input connected to the second input of the receiver for receiving the common mode voltage (e.g., Vcm or a ground potential), and an output. The seventh switch 329, which functions identically as the first switch 311 of the driver device 301, comprises an input connected to the negative input of the opamp 327, a control input connected to the phi1 output of the output bus of the second clock distribution device 323, and an output connected to the output of the opamp 327. The fifth capacitor 331 (e.g., Csh) is connected between the negative terminal and the output of the opamp 327.

The temperature-compensated ADC 333 is connected to the output of the opamp 327. The temperature-compensated ADC 333 compensates for changes in temperature as illustrated in FIG. 2 and described above in greater detail.

The charging and reading of the capacitors in the low-power capacitor sensor array 300 is similar to that of the low-power capacitor sensor 100 described above but with the addition of the 1:2 demultiplexer for selecting which row of the capacitor array 305 to charge and the 2:1 multiplexer 325 for selecting which column of the capacitor array 305 to read, which results in the charging of an entire row of capacitors in the capacitor array 305 but the reading of only one capacitor in the charged row of capacitors in the capacitor array 305.

Figure 4:
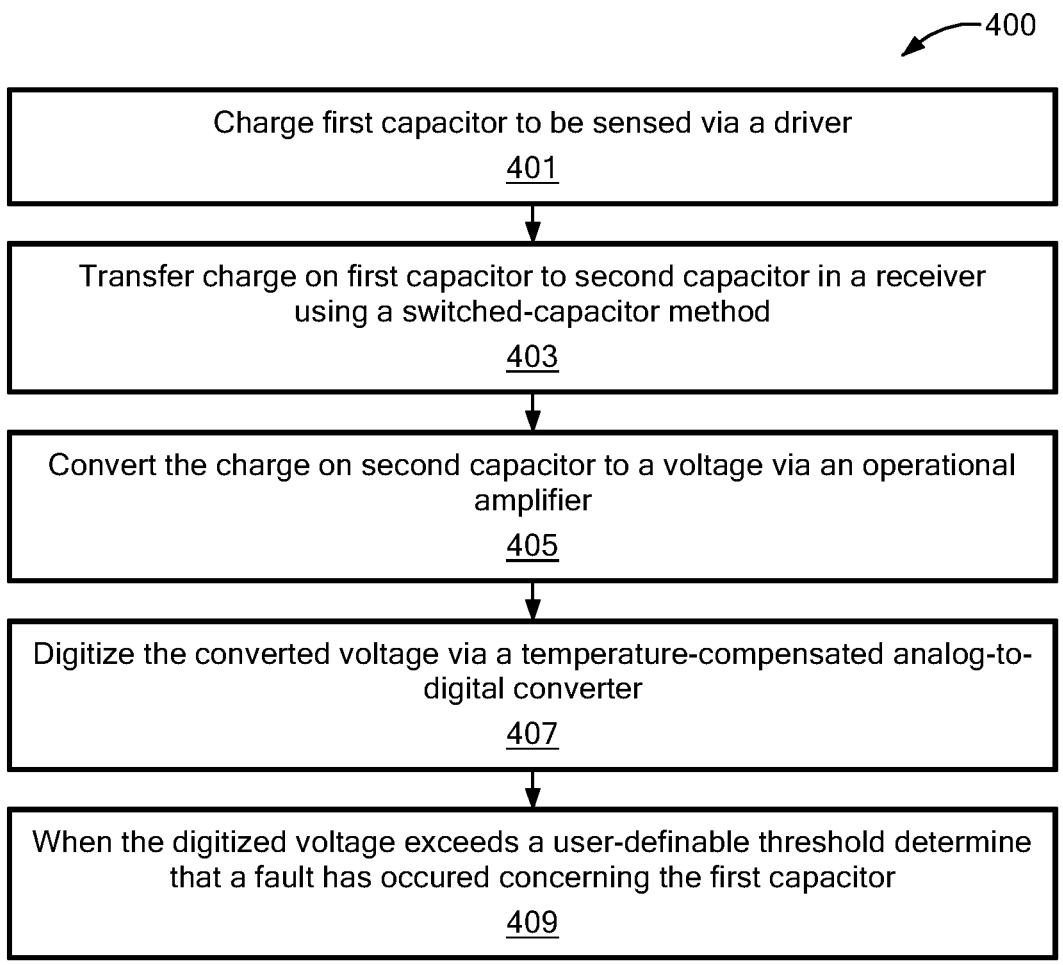
FIG. 4 is a flowchart of an exemplary method of a low-power capacitor sensor according to the present disclosure.

FIG. 4 is a flowchart of an exemplary method of a low-power capacitor sensor according to the present disclosure. Step 401 of the method 400 comprises charging a first capacitor to be sensed via a driver device. Step 403 of the method 400 comprises transferring the charge on the first capacitor to a second capacitor in a receiver using a switched-capacitor method. Step 405 of the method 400 comprises converting the charge on the second capacitor to a voltage via an operational amplifier. Step 407 of the method 400 comprises digitizing the converted voltage via a temperature-compensated ADC. Step 409 of the method 400 comprises determining that a fault has occurred concerning the first capacitor when the digitized voltage exceeds a used-definable threshold.

Figure 5:
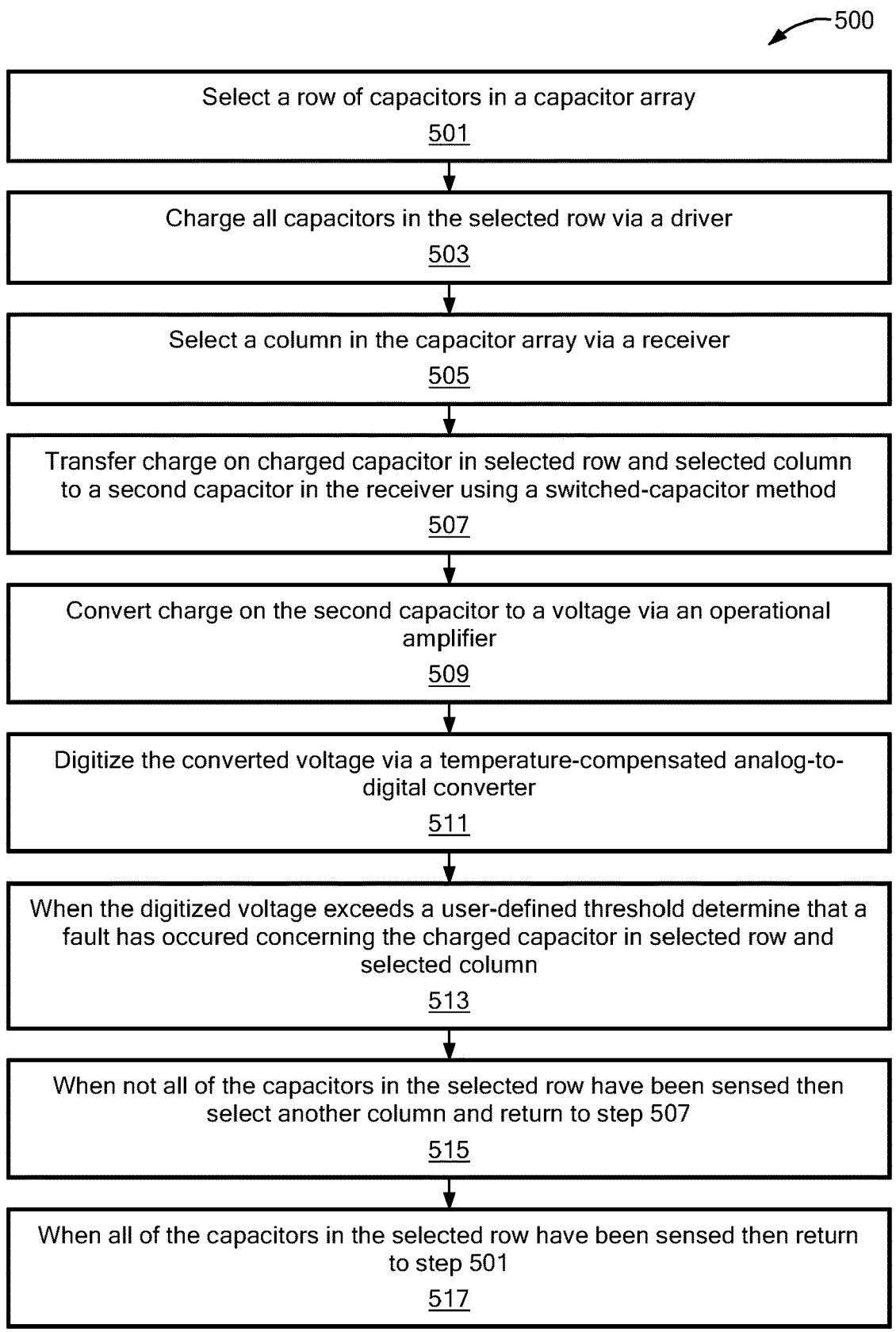
FIG. 5 is a flowchart of an exemplary method of a low-power capacitor sensor array according to the present disclosure.

FIG. 5 is a flowchart of an exemplary method of a low-power capacitor sensor array according to the present disclosure. Step 501 of the method 500 comprises selecting a row of capacitors to be sensed in a capacitor array. Step 503 of the method 500 comprises charging all of the capacitors in the selected row via a driver device. Step 505 of the method 500 comprises selecting a column in the capacitor array via a receiver. Step 507 of the method 500 comprises transferring the charge on the capacitor in the selected row and the selected column to a second capacitor in a receiver using a switched-capacitor method. Step 509 of the method 500 comprises converting the charge on the second capacitor to a voltage via an operational amplifier. Step 511 of the method 500 comprises digitizing the converted voltage via a temperature-compensated ADC. Step 513 of the method 500 comprises determining that a fault has occurred concerning the capacitor in the selected row and the selected column when the digitized voltage exceeds a used-definable threshold. Step 515 of the method 500 comprises selecting another column and returning to step 507 when not all of the capacitors in the selected row have been sensed. Step 517 of the method 500 comprises returning to step 501 when all of the capacitors in the selected row have been sensed.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "at least one" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A capacitive sensor, comprising:
    a driver device having a first input configured to receive a clock signal, a second input configured to receive a charging voltage, a third input configured to receive a common-mode voltage, and an output;
    a first capacitor configured to be sensed, having a first terminal connected to the output of the driver device and a second terminal, the first capacitor to be charged by the driver; and
    a receiver device having a first input configured to receive the clock signal, a second input connected to the second terminal of the first capacitor, and a third input configured to receive the common-mode voltage;
    an operational amplifier having a negative input connected to the second input of the receiver device, a positive input connected to the third input of the receiver device, wherein the second terminal of the first capacitor connected via a non-switched connection to the negative input of the operational amplifier; and
    a second capacitor connected between the negative input of the operational amplifier and the output of the operational amplifier,
    wherein the receiver device is configured to transfer charge on the first capacitor to the second capacitor using a switched-capacitor technique, and
    wherein the operational amplifier is configured to convert the charge on the second capacitor to a voltage.

2. The capacitive sensor of claim 1, wherein the driver device comprises:
    a first clock distribution device having an input connected to the first input of the driver device, a first output for providing a first clock signal phi1, and a second output for providing a second clock signal phi2 that does not overlap with the first clock signal phi1;
    a first switch having an input connected to the input of the driver device, a control input connected to the first output of the first clock distribution device, and an output connected to the output of the driver device, wherein the control input controls whether the output of the first switch is connected to the input of the first switch or not; and
    a second switch having an input connected to the third input of the driver device, a control input connected to the second output of the first clock distribution device, and an output connected to the output of the driver device, wherein the control input controls whether the output of the second switch is connected to the input of the second switch or not.

3. A capacitive sensor, comprising:
    a driver device having a first input configured to receive a clock signal, a second input configured to receive a charging voltage, a third input configured to receive a common-mode voltage, and an output;
    a first capacitor configured to be sensed, having a first terminal connected to the output of the driver device and a second terminal; and
    a receiver device having a first input configured to receive the clock signal, a second input connected to the second terminal of the first capacitor, and a third input configured to receive the common-mode voltage,
    a first clock distribution device having an input connected to the first input of the driver device, a first output for providing a first clock signal phi1, and a second output for providing a second clock signal phi2 that does not overlap with the first clock signal phi1;
    wherein the receiver device comprises:
    a second clock distribution device having an input connected to the first input of the receiver device, a first output for providing a third clock signal identical to the first clock signal phi1 of the driver device, and a second output for providing a fourth clock signal identical to the second clock signal phi2 of the driver device;
    an operational amplifier having a negative input connected to the second input of the receiver device, a positive input connected to the third input of the receiver device, and an output;
    a second capacitor having a first terminal connected to the negative input of the operational amplifier and a second terminal connected to the output of the operational amplifier;
    a third switch having an input connected to the first terminal of the second capacitor, a control input connected to the first output of the second clock distribution device, and an output connected to the second terminal of the second capacitor, wherein the control input controls whether the output of the third switch is connected to the input of the third switch or not; and
    a temperature-compensated analog-to-digital converter (ADC) having an input connected to the output of the operational amplifier.

4. The capacitive sensor of claim 3, wherein the temperature-compensated ADC comprises:
    a voltage reference generator having an input for receiving an analog power supply voltage (AVDD) and an output configured to provide a constant voltage independent of temperature and supply voltage;
    a buffer device, different from the driver device, having a first input connected to the input of the voltage reference generator, a second input connected to the output of the voltage reference generator, and an output having an adjustable slope for a conversely-proportional-to-absolute-temperature voltage (CTAT), a proportional-to-absolute-temperature (PTAT) voltage, and/or a bandgap voltage; and
    a second ADC having a negative terminal connected to the output of the buffer device.

5. The capacitive sensor of claim 4, wherein the second ADC has a resolution of at least 12 bits.

6. The capacitive sensor of claim 3, wherein the control inputs of the first switch, the second switch, and the third switch connect their outputs to their inputs for one of a logic one voltage and a logic zero voltage.

7. The capacitive sensor of claim 3, wherein the operational amplifier has a gain factor k, wherein k is a real number.

8. A capacitor array sensor, comprising:
a driver device having a first input configured to receive a clock signal Clk_in, a second input configured to receive a charging voltage Vin, a third input configured to receive a common-mode voltage Vcm, a fourth input configured to receive a select row signal sel_row, a fifth input for receiving an inverse of the sel_row signal (sel_rowb), a first output, and a second output;
a capacitor array having a first capacitor, a second capacitor, a third capacitor, and a fourth capacitor, wherein first terminals of the first capacitor and the second capacitor are connected to the first output of the driver device, first terminals of the third capacitor and the fourth capacitor are connected to the second output of the driver device, second terminals of the first capacitor and the third capacitor are connected to a first column of the capacitor array, and second terminals of the second capacitor and the fourth capacitor are connected to a second column of the capacitor array; and
a receiver device having a first input configured to receive Clk_in, a second input configured to receive Vcm, a third input configured to receive a column selection signal sel_col, a fourth input configured to receive an inverse of sel_col (sel_colb), a fifth input connected to the first column of the capacitor array, a sixth input connected to the second column of the capacitor array.

9. The capacitor array sensor of claim 8, wherein the driver device comprises:
a first clock distribution device having an input connected to the first input of the driver device, a first output for providing a first clock signal phi1, and a second output for providing a second clock signal phi2 that does not overlap with the first clock signal phi1; and
a 1:2 demultiplexer having a first input connected to the second input of the driver device, a second input connected to the third input of the driver device, a third input connected to the fourth input of the driver device, a fourth input connected to the fifth input of the driver device, a first output connected to the first terminals of the first capacitor and the second capacitor the capacitor array, and a second output connected to the first terminals of the third capacitor and the fourth capacitor of the capacitor array.

10. The capacitor array sensor of claim 9, wherein the 1:2 demultiplexer comprises:
a first switch having an input connected to the second input of the driver device, a control input connected to the first output of the first clock distribution device, and an output, wherein the control input controls whether the output of the first switch is connected to the input of the first switch or not;
a second switch having an input connected to the third input of the driver device, a control input connected to the second output of the first clock distribution device, and an output connected to the output of the first switch, wherein the control input controls whether the output of the second switch is connected to the input of the second switch or not;
a third switch having an input connected to the output of the first switch, a control input connected to the fourth input of the 1:2 demultiplexer, and an output connected to the first output of the driver device, wherein the control input controls whether the output of the third switch is connected to first switch or not;
a fourth switch having an input connected to the second input of the 1:2 demultiplexer, a control input connected to the third input of the 1:2 demultiplexer, and an output connected to the first output of the driver device, wherein the control input controls whether the output of the fourth switch is connected to the input of the fourth switch or not;
a fifth switch having an input connected to the output of the first switch, a control input connected to the third input of the 1:2 demultiplexer, and an output connected to the second output of the driver device, wherein the control input controls whether the output of the fifth switch is connected to the input of the fifth switch or not; and
a sixth switch having an input connected to the second input of the 1:2 demultiplexer, a control input connected to the fourth input of the 1:2 demultiplexer, and an output connected to the second output of the driver device, wherein the control input controls whether the output of the sixth switch is connected to the input of the sixth switch or not.

11. The capacitor array sensor of claim 8, wherein the receiver device comprises:
a second clock distribution device having an input connected to the first input of the receiver device, a first output for providing a third clock signal identical to a first clock signal phi1 of the driver device, and a second output for providing a fourth clock signal identical to a second clock signal phi2 of the driver device;
a 2:1 multiplexer having a first input connected to the fifth input of the receiver device, a second input connected to the sixth input of the receiver device, a third input connected to the second input of the receiver device, a fourth input connected to the third input of the receiver device, a fifth input connected to the fourth input of the receiver device, and an output;
an operational amplifier having a negative input connected to the second input of the receiver device, a positive input connected to the output of the 2:1 multiplexer device, and an output;
a fifth capacitor having a first terminal connected to the negative input of the operational amplifier and a second terminal connected to the output of the operational amplifier;
a seventh switch having an input connected to the first terminal of the fifth capacitor, a control input connected to the first output of the second clock distribution device, and an output connected to the second terminal of the fifth capacitor, wherein the control input controls whether the output of the seventh switch is connected to the input of the seventh switch or not; and
a temperature-compensated analog-to-digital converter (ADC) having an input connected to the output of the operational amplifier.

12. The capacitor array sensor array of claim 11, wherein the 2:1 multiplexer comprises:
an eighth switch having an input connected to the second input of the 2:1 multiplexer, a control input connected to the fourth input of the 2:1 multiplexer, and an output connected to the output of the 2:1 multiplexer, wherein the control input controls whether the output of the eighth switch is connected to the input of the eighth switch or not;
a ninth switch having an input connected to the third input of the 2:1 multiplexer, a control input connected to the fifth input of the 2:1 multiplexer, and an output connected to the input of the eighth switch, wherein the control input controls whether the output of the ninth switch is connected to the input of the ninth switch or not;

a tenth switch having an input connected to the first input of the 2:1 multiplexer, a control input connected to the fifth input of the 2:1 multiplexer, and an output connected to the output of the 2:1 multiplexer, wherein the control input controls whether the output of the tenth switch is connected to the input of the tenth switch or not; and an eleventh switch having an input connected to the third input of the 2:1 multiplexer, a control input connected to the fourth input of the 2:1 multiplexer, and an output connected to the input of the tenth switch, wherein the control input controls whether the output of the eleventh switch is connected to the input of the eleventh switch or not.

13. The capacitor array sensor of claim 11, wherein the temperature-compensated ADC comprises:

a voltage reference generator having an input for receiving an analog power supply voltage (AVDD) and an output configured to provide a constant voltage independent of temperature and supply voltage;

a buffer device, different from the driver device, having a first input connected to the input of the voltage reference generator, a second input connected to the output of the voltage reference generator, and an output having an adjustable slope for a conversely-proportional-to-absolute-temperature voltage (CTAT), a proportional-to-absolute-temperature (PTAT) voltage, and/or a bandgap voltage; and a second ADC having a negative terminal connected to the output of the buffer device.

14. The capacitor array sensor of claim 13, wherein the second ADC has a resolution of at least 12 bits.

15. The capacitor array sensor of claim 12, wherein the control inputs of the first switch, the second switch, the third switch, the fourth switch, the fifth switch, the sixth switch, the seventh switch, the eighth switch, the ninth switch, the tenth switch, and the eleventh switch connect their outputs to their inputs for one of a logic one voltage and a logic zero voltage.

16. The capacitor array sensor of claim 11, wherein the operational amplifier has a gain factor k, wherein k is a real number.

* * * * *